(12) United States Patent
Mouro

(10) Patent No.: US 7,357,589 B2
(45) Date of Patent: Apr. 15, 2008

(54) ADJUSTABLE STEERING TIE-ROD WITH LONGITUDINAL LOCKING DEVICE

(75) Inventor: Marcos Antonio Rodrigues Mouro, São Paulo (BR)

(73) Assignee: Dana Industrial S/A, State of Sao Paulo (BR)

( * ) Notice: Subject to any disclaimer, the term of this patent is extended or adjusted under 35 U.S.C. 154(b) by 730 days.

(21) Appl. No.: 10/101,228

(22) Filed: Mar. 20, 2002

(65) Prior Publication Data

US 2002/0136596 A1  Sep. 26, 2002

(30) Foreign Application Priority Data

Mar. 20, 2001 (BR) .................................. 0101245

(51) Int. Cl.
*F16B 7/06* (2006.01)
(52) U.S. Cl. .................. 403/47; 403/371; 403/48; 403/234; 403/309
(58) Field of Classification Search ............. 403/47, 403/48, 234, 237, 243, 296, 374.3, 374.4, 403/306–309, 361, 371; 411/938, 928, 972
See application file for complete search history.

(56) References Cited

U.S. PATENT DOCUMENTS 2,120,577 A * 6/1938 Schulte
3,479,675 A * 11/1969 Ricca ...................... 411/938 X
6,074,125 A * 6/2000 Krawczak ................ 403/374.3
6,276,399 B1 * 8/2001 Fox

* cited by examiner

Primary Examiner—Daniel P. Stodola
Assistant Examiner—Victor MacArthur
(74) Attorney, Agent, or Firm—Berenato, White & Stavish

(57) ABSTRACT

An adjustable steering tie-rod assembly having a threaded rod, connected to a tube having an annular cavity and an intermediate tubular member. The intermediate member has internal and external threads with longitudinal grooves in sectioned lines. The threaded steering terminal, intermediate member and tube are connected in a concentric arrangement. The internal and external threads of the intermediate member facilitate adjusting the length of the assembly without axial movement of the intermediate member. The bracketing assembly is designed to ensure that the components are adequately fixed and form a solid assembly. The longitudinal grooves of the intermediate member are thrust on the external thread of the rod of the steering terminal and on the internal thread of the tubular extremity of the steering tie rod, to provide locking of the assembly and hindering the spontaneous rotating movement of the components regardless of the specific geometry of the steering tie-rod.

9 Claims, 1 Drawing Sheet

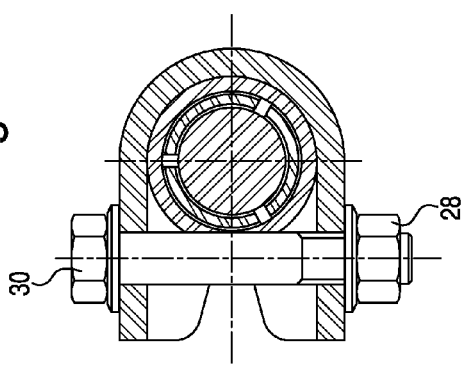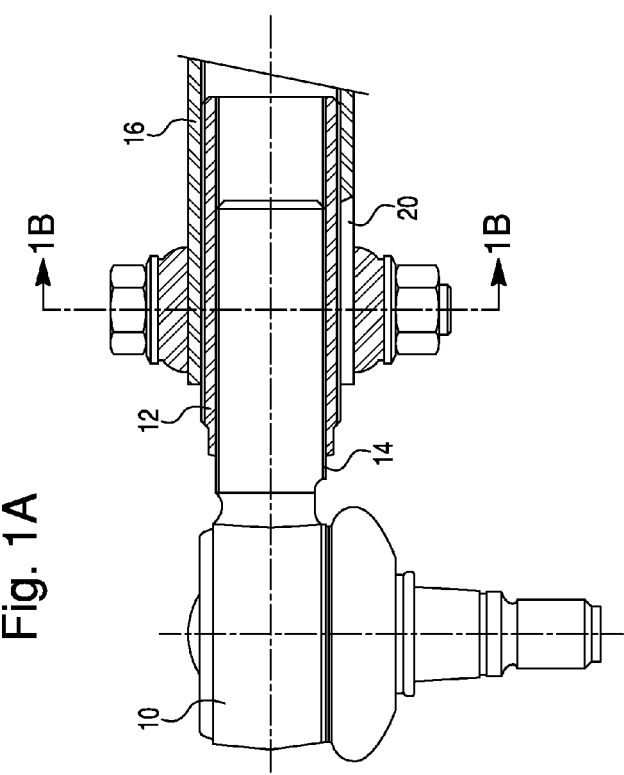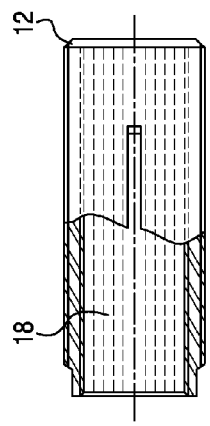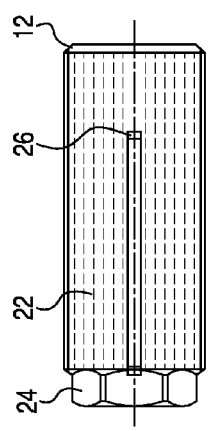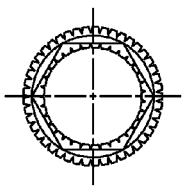

ADJUSTABLE STEERING TIE-ROD WITH LONGITUDINAL LOCKING DEVICE

BACKGROUND OF THE INVENTION

1) Field of the Invention

This invention relates to improved steering tie-rods for automotive vehicles, and particularly directed to an adjustable tie-rod facilitating adjustment of the steering tie-rod in a millimetrical way, without need of disassembling in order to adjust the grade of toeing-in or toeing-out prescribed for the front wheels of the vehicle.

2) Discussion of the Related Art

Conventional steering tie rods employ a regulating rod having a cap, with left internal threads at one side and right internal threads at the other side where steering terminals are mounted. Adjustment is obtained through the rotation of this cap in an appropriate direction, and a pair of brackets, as well as screws and fixing nuts used to obtain of a perfect fixing.

This construction has the disadvantage of needing such fixing systems (brackets, screws and nuts), one for each extremity of the cap, thus requiring a larger space, increasing the extension and making difficult the utilization of this system in some cases, besides the need of working in a larger space and rendering difficult the use of the tool during the work of regulation and fixing of the steering bar in the vehicle.

Another form utilized for the regulation adjustment is the employment of an intermediate member having internal and external threads. The adjustment is obtained through the rotation of this member in the appropriate direction.

This construction has the disadvantage of displacing this member in the axial direction weakening the portion when performing the coupling, diminishing the security factor, which normally is assured by rigid means of control of the mounting of the intermediate member.

SUMMARY OF THE INVENTION

This invention eliminates all the previously mentioned inconveniences, as it allows regulation of the geometry of the front wheels in any projects, in view of it occupying an extremely reduced space, allowing regulation in a small space and maintaining the rigidity required for the safety of the users of automotive vehicles, as it locks the threaded pieces, after the regulation, through longitudinal grooves in sectioned lines over internal and external threads of the regulating member, preventing the spontaneous spinning movement of the components regardless of the specific geometry of the steering tie rod.

BRIEF DESCRIPTION OF THE DRAWINGS

The invention will be better understood by elucidation through an example of embodiment, described as follows, with references to the attached drawings, which show:

FIG. 1A, is a partial sectional view of the steering tie-rod assembly according to the present invention.

FIG. 1B is a cross sectional view taken along line 1B-1B of the tie-rod assembly of FIG. 1A.

FIG. 2, is a front view of the intermediate regulating member of the tie-rod assembly of FIG. 1A;

FIG. 3 is a side view of the intermediate regulating member of FIG. 2; and

FIG. 4 is a partial sectional view of the intermediate regulating member of FIG. 3.

DETAILED DESCRIPTION OF THE PREFERRED EMBODIMENTS

The assembly of FIGS. 1A-1B, includes a steering terminal (10) mounted on the extremity of the steering tie-rod (16) through a regulating member (12). The steering terminal (10) connects to the steering arm of a steering knuckle of the front wheels of the vehicle.

The regulating member (12), according to this invention, provides a means for regulation of the length of the steering tie-rod, with the purpose of regulating the toeing-in or toeing-out of the front wheels of a vehicle.

The steering terminal (10) includes a threaded region (14) on its extremity. This thread is normally with pitch to the right. The tubular extremity (16) has in its interior a cavity (18) and an axially extended slot (20). An intermediate member (12) with a tubular construction having in its internal profile a right pitch thread, that corresponds to the thread (14) of the steering terminal (10), and longitudinal grooves in sectioned lines (18) on the thread that has the function of locking the intermediate member (12) against the threaded region (14) of the steering terminal (14), preventing its spontaneous spinning in relation to the intermediate member (12). The intermediate member (12) is provided with a hexagonal profile (24). A part of the intermediate member (12) is closed to form an axially extended slot (26) aiming also to lock and prevent the spontaneous spinning of the intermediate member (12) relative to the tubular extremity of the steering tie-rod (16), there are also on the external thread of the intermediate member (12), longitudinal grooves in sectioned lines (22).

For better clarification, we describe below the operation of the adjustable system of steering tie-rod, object of this invention:

The intermediate member (12) is encased in the tubular extremity of the steering tie-rod (16) and the steering terminal (10) is threaded to the intermediate member (12) in a concentric coupling. When a regulation in the total length of the steering tie-rods (16) is desired, a tool is utilized through the hexagonal part (24) spinning the intermediate member (12). This axial displacement causes reduction or increasing in the extension of the steering tie-rod (16), depending on the direction the intermediate member (12) is rotated. After the adjustment is proceeded, the nut (28) of the screw (30) that fastens the bracket is fixed, causing a solidary fixing through the compensation of clearances caused by the reduction of width via slots (20) and (26). When the nut (28) of the bracket is tightened, an accidental rotation of the intermediate member (12) is prevented by the locking of the longitudinal grooves in sectioned lines (18) anticipated over the internal thread existent in the intermediate member (12), and also by the longitudinal grooves in sectioned lines (22) anticipated over the external thread of the intermediate member (12). This arrangement prevents the spontaneous rotation of the pieces between themselves, namely, steering terminal (10), intermediate member (12) and tubular extremity of the steering tie-rod (16), maintaining a fixed regulation of the assembly.

In short, the adjusting of a steering tie-rod, according to this invention, has a simple construction and easy access to the fastening screw (30) and fixing nut (28), facilitated by its relative position. Through such extremely compact construction, and by its reliability in view of the non-existence of spontaneous rotation of the pieces between themselves, and in view of the locking system provided by the longitudinal grooves in sectioned lines (18) and (22), an improved tie-rod assembly is provided.

What is claimed is:

1. An adjustable steering tie-rod assembly having a longitudinal locking device, said assembly comprising:
   a steering terminal having an external threaded region on a rod portion thereof, the rod portion being in the interior of an intermediate member with internal and external threads, said internal and external threads having pitches opposite to each other which in turn is coupled in a tubular extremity of a steering tie-rod with internal threads, wherein the intermediate member is provided with longitudinal grooves in sectioned lines on its internal and external threads.

2. The adjustable steering tie-rod assembly according to claim 1, wherein said assembly is provided with a tightening bracket assembly disposed about said tie-rod, said tightening bracket provided to lock the steering terminal, intermediate member and tubular extremity of the steering tie-rod, said longitudinal grooves in sectioned lines on the internal and external threads of the intermediate member hindering spontaneous rotation of the tie-rod relative to the steering terminal.

3. An adjustable tie rod assembly comprising:
   a tie rod member having a first tubular portion with internal threads;
   a steering terminal member having a rod portion with an external threaded portion at least partially disposed within said first tubular portion of said tie rod member; and
   an intermediate tubular member disposed between said tie rod member and said steering terminal member, said intermediate tubular member having internal threads engaging said external threaded portion of said steering terminal member and external threads engaging said internal threads of said tubular portion of said tie rod, whereby relative rotation of said intermediate regulating member relative to either said steering terminal member or said tie-rod facilitates an adjustment of an overall length of said tie rod assembly; wherein said intermediate tubular member includes longitudinal grooves on said internal and external threads to inhibit spontaneous rotation of the tie-rod member relative to the steering terminal.

4. The tie-rod assembly according to claim 3, further comprising:
   a locking bracket disposed about said tie rod member to lock said tie rod member, said steering terminal member and said intermediate tubular member in a fixed relative position.

5. The adjustable tie rod assembly according to claim 4, wherein said locking bracket includes:
   a first portion substantially circumscribing said first tubular portion of said tied rod member;
   an adjustable bolt extending through said first portion wherein when said adjustable bolt is tightened, said first portion constricts about said first tubular portion of said tie rod and thereby locks said tie rod member, said intermediate tubular member and said steering terminal member in a fixed position.

6. The adjustable tie rod assembly according to claim 3, wherein said intermediate tubular member comprises at least one axially extended slit.

7. The adjustable tie rod assembly according to claim 6, wherein said intermediate tubular member has a plurality of spaced apart axially extended slits.

8. The adjustable tie rod assembly according to claim 3, wherein said intermediate tubular member includes a hexagonal shaped end portion to facilitate rotation by engaging a tool.

9. The adjustable tie rod assembly according to claim 3, wherein said intermediate tubular member has at least three equally spaced axially extended slots.

* * * * *